United States Patent
Abramson et al.

[11] Patent Number: 5,860,154
[45] Date of Patent: *Jan. 12, 1999

[54] METHOD AND APPARATUS FOR CALCULATING EFFECTIVE MEMORY ADDRESSES

[75] Inventors: Jeffrey M. Abramson, Aloha; Haitham Akkary, Portland; Andrew F. Glew, Hillsboro; Glenn J. Hinton; Kris G. Konigsfeld, both of Portland; Paul D. Madland, Beaverton; Mark A. Timko, Portland, all of Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 778,969

[22] Filed: Jan. 6, 1997

Related U.S. Application Data

[63] Continuation of Ser. No. 284,801, Aug. 2, 1994, abandoned.

[51] Int. Cl.[6] .................................................. G06F 12/00
[52] U.S. Cl. ........................................... 711/220; 395/393
[58] Field of Search .................................. 711/200, 220, 711/215; 395/393, 394, 392, 562

[56] References Cited

U.S. PATENT DOCUMENTS 5,408,626  4/1995  Dixit ..................................... 395/421.1

OTHER PUBLICATIONS

Popescu, et al., "The Metaflow Architecture," IEEE Micro, pp. 10–13 and 63–73, Jun. 1991.

Superscalar Microprocessor Design, Mike Johnson, Prentice–Hall, Englewood Cliffs, NJ, chap 3, 1991.

*Primary Examiner*—Jack A. Lane
*Attorney, Agent, or Firm*—Blakely, Sokoloff, Taylor & Zafman LLP

[57] ABSTRACT

A macro instruction is provided for a microprocessor which allows a programmer to specify a base value, index, scale factor and displacement value for calculating an effective address and returning that result in a single clock cycle. The macro instruction is converted into a micro operation which is provided to the single-cycle execution unit with the required source operands for performing the calculation. Within the single-cycle execution unit, the index and scale factor are provided to a left shifter for multiplying the two values. The result of the left shift operation is added to the sum of the base and displacement. This results in the effective address which is then returned from the single-cycle execution unit to a predetermined destination. This provides for the calculation of an effective address in a single cycle pipeline execution unit that is independent of the memory system execution units.

14 Claims, 6 Drawing Sheets

METHOD AND APPARATUS FOR CALCULATING EFFECTIVE MEMORY ADDRESSES

This is a continuation of application Ser. No. 08/284,801, filed Aug. 2, 1994, now abandoned.

BACKGROUND OF THE INVENTION

1. Field of the Invention

The present invention relates to the field of microprocessor architecture. More specifically, the present invention relates to a method and apparatus for the efficient calculation of effective memory addresses in accordance with a segmented memory protocol.

2. Art Background

As the computer revolution has progressed the quest of microprocessor developers has been to develop chips exhibiting more power and faster performance. Initial efforts focused essentially on increasing transistor populations on single microprocessor integrated circuits. That effort continues with today's microprocessors now housing literally millions of transistors on a single chip. Further integration has allowed processor clock speeds to be greatly increased with the increased density of transistors.

In addition to squeezing performance by overcoming physical limitations, microprocessor design has developed into an art form. Microprocessors are divided into discrete functional blocks through which instructions are propagated one stage at a time. This allows for pipelining of instructions such that when one instruction has completed the first stage of processing and moves on to the second stage, a second instruction may begin the first stage. Thus, even where each instruction requires a number of clock cycles to complete all stages of processing, pipelining provides for the completion of instructions on every clock cycle. This single-cycle throughput of a pipelined microprocessor greatly increases the overall performance of computer systems.

Other enhancements to microprocessor design include the development of superscalar microprocessors which are capable of initiating more than one instruction at the initial stage of the pipeline per clock cycle. Likewise, in a superscalar microprocessor, frequently more than one instruction completes on each given clock cycle. Other development efforts have gone into the simplification of microprocessor instruction sets, developing reduced instruction set (RISC) microprocessors which exploit the fact that many simple instructions are more commonly executed than some complicated instructions. Eliminating the complicated instructions from the instruction set provides for a faster executing pipeline. Complicated instructions are carried out by combinations of the more simple instructions.

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instruction until the condition is resolved. Since the condition will not be resolved until further down the pipeline, the instruction fetch unit may not be able to fetch proper instructions.

To overcome this problem, many pipelined microprocessors use branch prediction mechanisms that predict the outcome of branches and then fetch subsequent instructions according to branch prediction. Branch prediction is achieved using a branch target buffer (BTB) to store the history of a branch instruction based upon the instruction pointer or address of that instruction. Every time a branch instruction is fetched, the branch target buffer predicts the target address of the branch using the branch history. Speculative execution is where instructions are initiated and completed before knowing if they are the correct instructions. This usually includes prediction with a BTB.

In addition to speculative execution, substantial increases in instruction throughput are achievable by implementing out-of-order dispatch of instructions to the execution units. Many experiments have confirmed that typical von Neumann code provides substantial parallelism and hence a potential performance boost by use of out-of-order execution. Out-of-order execution is possible when a given instruction does not depend on previous instructions for a result before executing. With out-of-order execution, any number of instructions are allowed to be in execution in the execution units, up to the total number of pipeline stages for all the functional units.

In a processor using out-of-order execution, instruction dispatching is stalled when there is a conflict for a functional unit or when a dispatched instruction depends on the result of an instruction that is not yet computed. In order to prevent or mitigate stalls in decoding, previous texts have described the provision of a buffer known as a reservation station (RS) between the decode and execute stages. The processor decodes instructions and places them into the reservation station as long as there is room in the buffer and at the same time examines instructions in the reservation station to find those that can be dispatched to the execution units (that is, instructions for which source operands and execution units are available). Data-ready instructions are dispatched from the reservation station with little regard for their original program order. For further background on the use of reservation stations and out-of-order execution, see Mike Johnson, *Superscalar Microprocessor Design* and Prentice-Hall, Inc., 1991, Chapters 3 and 7.

Since the advent of the microprocessor industry, one architecture has emerged as the dominant standard in the marketplace. This is the Intel Architecture Microprocessor. The Intel Architecture Microprocessor was one of the earliest general purpose microprocessors that facilitated the proliferation of computers to the extent that they are in use today. The architecture has proceeded through many generations of new designs, each providing more power and greater speed than the previous.

In the Intel Architecture and other microprocessor architectures, it is frequently necessary to identify memory locations in different domains. Often, operating systems will be based on a virtual memory mapping in which virtual memory addresses (also referred to as a linear address) will have to be converted by a translation lookaside buffer into a corresponding physical address. The Intel Architecture Microprocessor implements a segmented memory scheme in which an effective address for a memory location is determined by a base address to a memory block, indexed by an index value which may be scaled by a scaling factor and then ultimately shifted by a displacement value. In the segmented memory model approach, memory is segmented into multiple, independent address spaces. The beginning of each segment is specified by a segment base address, and the location within the segment is indicated by an offset. An address specified in program code is denoted an "effective addresses", which is treated as the offset into the segment. Segmentation hardware translates the virtual address into the address in a segment address called the "linear address" by adding the segment base to the effective address.

When memory operations are carried out by a processor, one component of the operation is generally to calculate the necessary linear or effective address for performing the memory operation. This step is usually incorporated into the memory subsystem components which are provided with the necessary parameters for calculating a memory address for loads and writes to be propagated to the actual memory controllers. There are, at times, situations in which memory addresses are desirable to be calculated when no actual memory operation is intended to be carried out. One particular example has to do with the allocation of memory space for various applications. In the past, when it has been necessary to calculate a memory address it was necessary to use those components of the memory subsystem for calculating such things or to generate effective procedures that to be carried out by other execution units existing features. One disadvantage of prior approaches is that to use the memory subsystem components, introduces a protracted latency because of the time generally required for memory operations and the speed of the memory operating functional units. It would be advantageous, and is therefore an object of the present invention, to provide a mechanism that is independent of the memory execution units and subsystem for calculating memory addresses to increase the throughput of a microprocessor pipeline.

SUMMARY OF THE INVENTION

From the foregoing it can be appreciated that there is a need to calculate effective memory addresses independent of using a microprocessor's memory execution units. It is therefore an object of the present invention to provide a method and apparatus for the calculation of effective memory addresses within a microprocessor independent of the microprocessor's memory execution units, increasing the throughput of the microprocessor's pipeline.

These and other objects of the present invention are provided by the inclusion of additional circuitry in a single-cycle execution unit included within the microprocessor. A macro instruction is provided for the processor which allows a programmer to specify a base value, index, scale factor and displacement value for calculating an effective address and returning that result in a single clock cycle. The macro instruction is converted into a micro operation which is provided to the single-cycle execution unit with the required source operands for performing the calculation. In one embodiment, the scaling factor is incorporated into the micro operation opcode itself.

In one embodiment, within the single-cycle execution unit, the index and scale factor are provided to a left shifter for multiplying the two values. In this embodiment, the scale factor will be equal to $2^n$ where n is a positive integer value or zero. The result of the left shift operation is added to the sum of the base and displacement. This results in the effective address which is then returned from the single-cycle execution unit to a predetermined destination. This provides for the calculation of an effective address in a single cycle pipeline execution unit that is independent of the memory system execution units which would normally require greater latency.

Another aspect of the present invention is that it provides a mechanism for performing certain multiply operations in a single-cycle execution unit where ordinarily multiply operations require multiple clock cycles to complete in multi-cycle functional units. By appropriately setting the input parameters to the effective address macro instruction, multiplies of $X*2^n$ will be produceable from the single-cycle execution unit in a single clock cycle. By setting the base and displacement values to zero, the present invention provides a mechanism for multiplying the specified index by $2^{scale}$. The result is then written back from the single-cycle execution unit more quickly than other multiplies may be carried out.

BRIEF DESCRIPTION OF THE DRAWINGS

The objects, features and advantages of the present invention will be apparent from the following detailed description in which.

DETAILED DESCRIPTION OF THE INVENTION

The present invention provides a method and apparatus for efficient calculation of effective memory addresses independent of the memory subsystem. In the following description, numerous specific details are set forth such as particular execution unit names and specified processor types in order to provide a thorough understanding of the present invention. It will be appreciated, however, by one skilled in the art that the present invention may be practiced in a more general application where such advantages provided by the present invention are desired. In other instances, well-known control structures and gate level circuits have not been shown in detail in order not to obscure important aspects of the present invention. Particularly, many functions are described to be carried out by various logic and multiplexing circuits. Once the various functions have been described, a practitioner of ordinary skill in the art will be able to implement the necessary logic and multiplexing circuits without undue experimentation.

Figure 1:
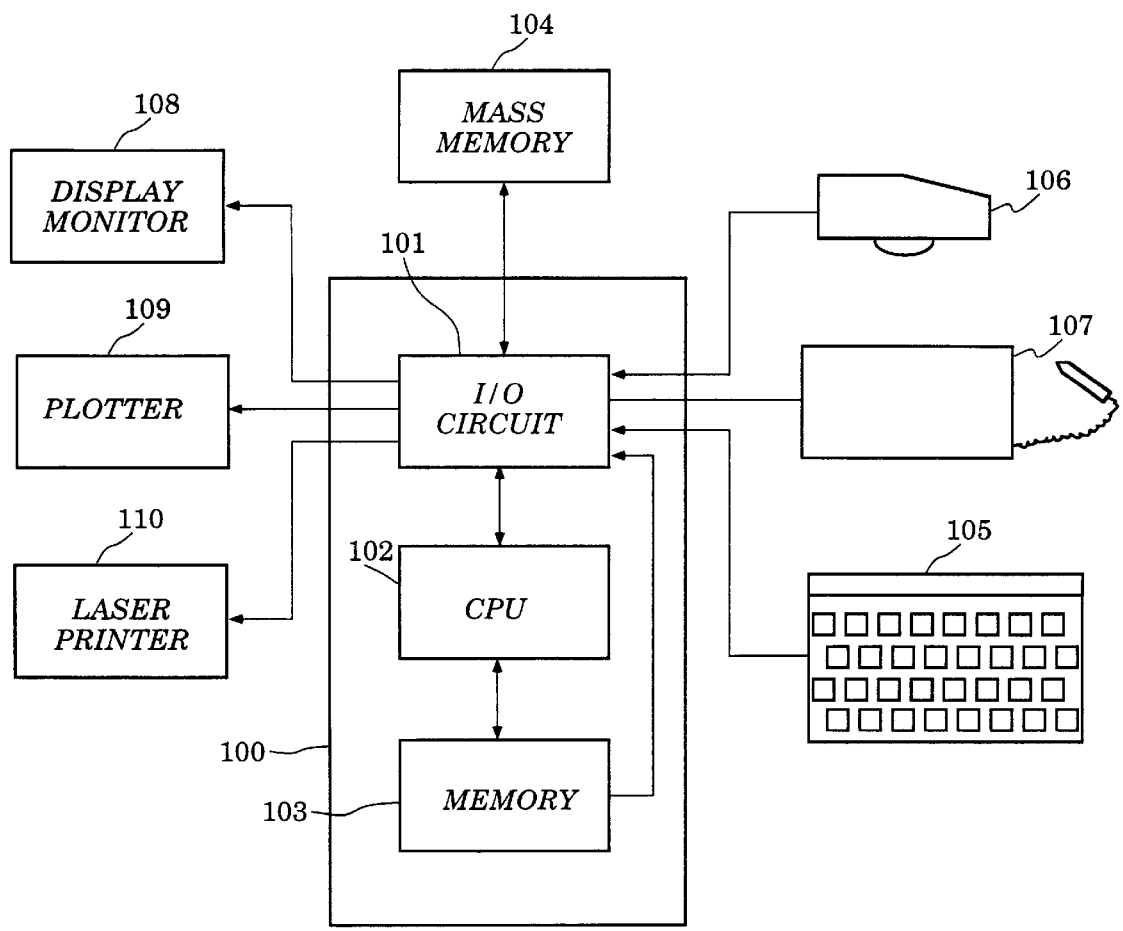
FIG. 1 illustrates a basic computer architecture which may incorporate the present invention.

Referring first to FIG. 1, a typical computer system which may utilize a microprocessor that implements the present invention is illustrated. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor.

Also shown in FIG. 1 is an input device 105, shown in a typical embodiment as a keyboard. There is also shown as an input device a graphics tablet 107. It should be understood, however, that the input device may actually be in any other well-known input device (including, of course, another computer). A mass memory device 104 is coupled to I/O circuit 101 and provides additional storage capabilities for the computer 100. The mass memory may include other programs and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. A cursor control device 106, such as a mouse, trackball or stylus are also coupled to I/O circuit 101. Other pointing devices may suitably be used as appropriate.

The present invention is intended to be implemented in a microprocessor that executes the well-known Intel Architecture Microprocessor instruction set. The present invention may, however, be implemented in any microprocessor architecture in which it is desirable to calculate memory addresses. A variety of microprocessors may take advantage of the present invention whether those microprocessors occupy a single chip or more than one and regardless of the materials used to fabricate the chip including silicon or gallium arsenide.

The microprocessor of the present invention, prior to executing Intel Architecture Microprocessor instructions, decodes them into a more simple, stylized sequence of "micro operations." The micro operations are then analyzed and scheduled according to resolved dependencies thus implementing out-of-order execution.

Figure 2:
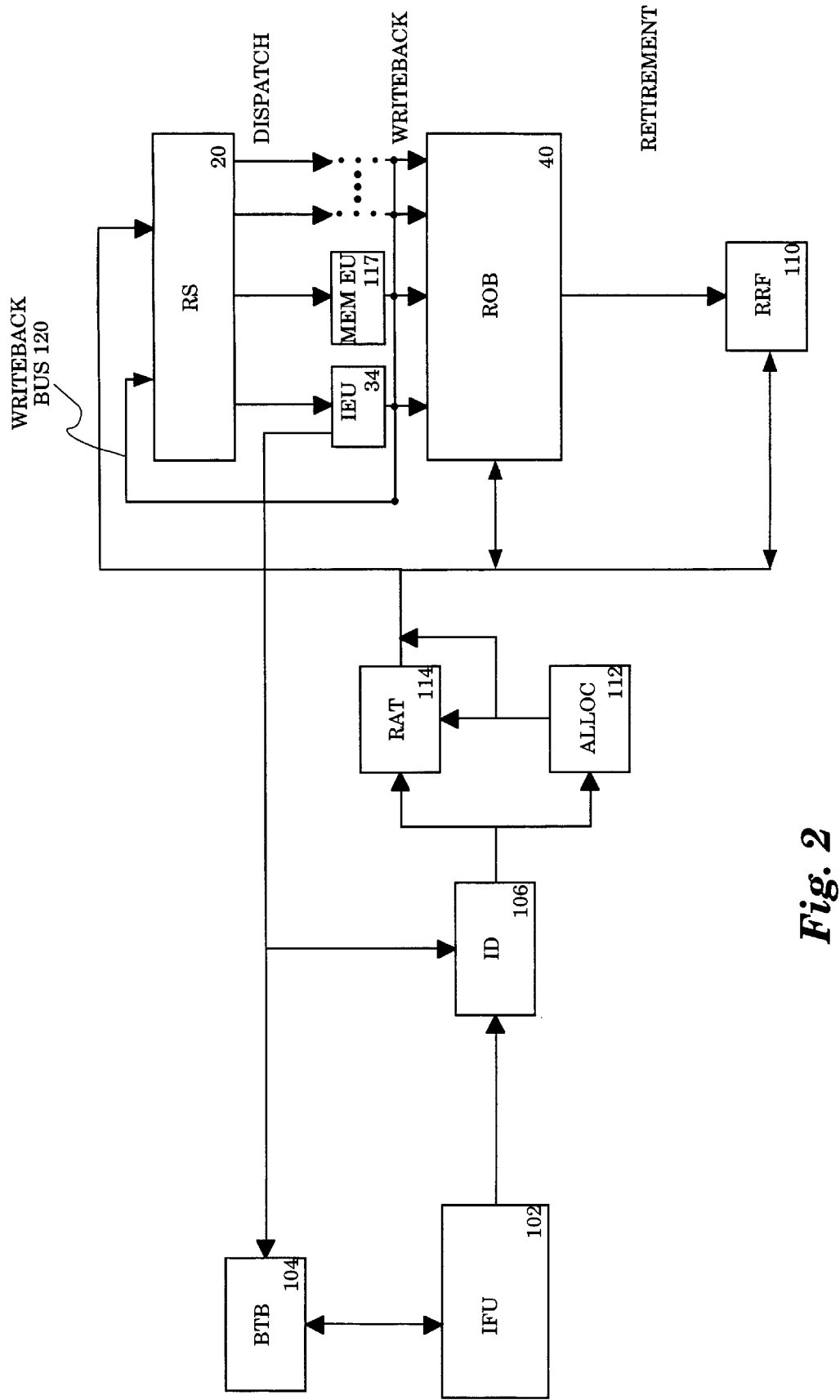
FIG. 2 is a block diagram illustrating a portion of a microprocessor incorporating the present invention.

FIG. 2 is a block diagram of one embodiment of a speculative out-of-order processor in accordance with the present invention. The processor comprises an instruction fetch unit (IFU) 102 coupled to a branch target buffer (BTB) 104 and an instruction decoder (ID) 106. Based upon the instruction pointer (IP) provided by the BTB 104 to the IFU 102, the IFU 102 fetches the macro instruction found at the address in memory (not shown) that is indicated by the IP. The instruction is decoded into one or more micro operations by the instruction decoder 106. Such a decoding mechanism is found in the Intel Microprocessor Architectures. The instruction decoder 106 transfers the stream of micro operations to a register alias table (RAT) 114 and an allocator (ALLOC) 112. In one embodiment, the instruction decoder 106 issues up to three in-order micro operations during each cycle of the processor.

The allocator 112 assigns each incoming micro operation to a location in the reorder buffer (ROB) 40, thereby mapping the logical destination address (LDST) of the micro operation to a corresponding physical destination address (PDST) in the ROB. The register alias table (RAT) 114 maintains this mapping.

The contents of a ROB register are retired to a location in a real register file (RRF) 110. The RAT 114 thus also stores a real register file valid bit (RRFV) that indicates whether the value indicated by the logical address is to be found at the physical address in the ROB or in the RRF after retirement. Based upon this mapping, the RAT 114 also associates every logical source address to a corresponding location in the ROB or the RRF (the source operand of one instruction generally must have been the destination of a previous instruction).

Each incoming micro operation is also assigned and written into an entry in the reservation station 20 by the allocator 112. The reservation station (RS) 20 assembles the micro operations awaiting execution by an appropriate execution unit, such as integer execution unit (IEU) 34 or memory execution unit (MEM EU) 117. Results are written back over result or writeback bus 120.

Figure 3:
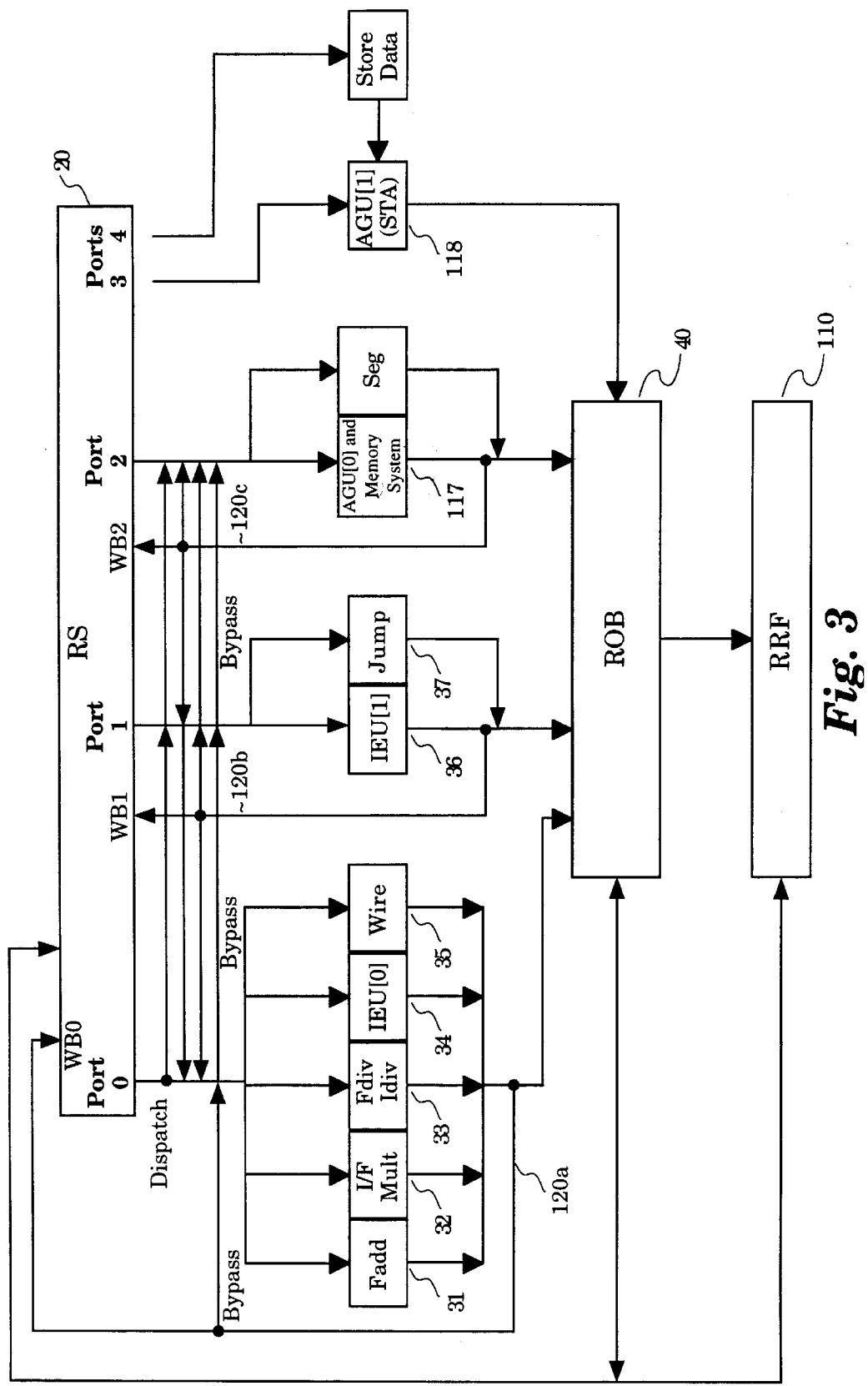
FIG. 3 illustrates a more detailed block diagram of the out-of-order core of a microprocessor incorporating a preferred embodiment of the present invention.

FIG. 3 illustrates a more detailed portion of the microprocessor incorporating the present invention. The microprocessor implementing one embodiment of the present invention may perform out-of-order execution of instructions. The portion of the microprocessor illustrated in FIG. 3 can be considered the out-of-order core of the microprocessor. The first element of the out-of-order core illustrated in FIG. 3 is the reservation station 20. The reservation station 20 is a buffer in front of the functional units that holds micro operations that are waiting for needed resources in order to execute. These needed resources include the source data operands (that previous micro operations may not yet have created) and a functional unit with which to execute the micro operation.

The reservation station performs several functions. Its data fields serve as a temporary buffer for instructions and the source data that is or will be available. The reservation station maintains waiting instructions and is "watching" all the result/writeback buses from all the execution interfaces "looking" for source data that it needs for its micro operations. When the watched-for data arrives on the result bus 120, the reservation station writes it into the appropriate source data field.

Once all the source operands for a micro operation are in the reservation station, the reservation station determines when an appropriate execution unit is available and schedules the data ready micro operation for dispatch.

The reservation station 20 of FIG. 3 is illustrated having five dispatch ports. Functional micro operations in the embodiment illustrated will be dispatched over either Dispatch Port 0 or Dispatch Port 1. Memory operations will be dispatched through Dispatch Ports 2–4. In one embodiment of the microprocessor, there are five execution units coupled to Dispatch Port 0 from reservation station 20. These are the floating point add unit 31, the multiply unit 32 for performing integer and floating point multiplies, integer and floating point divide unit 33, integer execution unit 34, and a hybrid execution unit 35. As was described, the complex Intel Microprocessor instruction set is reduced to a simpler stream of micro operations. These micro operations, when they are dispatched from the reservation station, are operated on by the various execution units. Most applications heavily utilize the integer execution unit. Integer execution unit 34 is designed to be able to process data-ready micro operations in one clock cycle. It is therefore referred to as a single-cycle functional unit. The integer execution unit 34 receives data having a width of 32 bits. The floating point execution units 31, 32 and 33 carry out more complicated tasks when they receive data-ready micro operations. These functional units receive input streams having a width for 86 bits of source data.

In one embodiment of the present invention microprocessor, a floating point add requires three clock cycles to execute, and a floating point multiply requires five clock cycles to execute. Floating point divides and square roots, which are both carried out by the floating point divide unit 33, have variable length latencies depending upon the precision required for their result. The wire unit 35 is a hybrid execution unit implemented in one embodiment for various other instructions. It is similar to a floating point unit in that its input stream takes sources that are 86 bits wide, but it is more like an integer execution unit in that it performs its operations in a single clock cycle.

Dispatch Port 1 from reservation station 20 also has two execution units coupled to it. There is an integer execution unit 36 and a jump unit 37. The integer execution unit 36 may be identical to the execution unit 34, or it may have additional or different functionality. Two integer execution units are provided because of the high volume of integer micro operations common in most code, thereby enhancing performance of the overall system. Of course, alternative microprocessors may incorporate more or fewer execution units depending upon design objectives.

After an execution unit executes a micro operation, it writes back the result to the reorder buffer 40 over writeback bus 120a or 120b. The reorder buffer 40 serves as the place where the results of out-of-order operations are collected so that they can later be committed to machine state in strict von Neumann order the committed state registers being in the RRF 110. Thus, the reorder buffer is where the out-of-order core reassembles the instruction stream into its program order, before commitment to state. At the same time that execution units writeback to the reorder buffer 40, they may simultaneously writeback to the reservation station 20. It may be that the result of an execution unit's operation provides a source operand needed for the execution of another micro operation waiting in the reservation station. Similarly, a result from one execution unit may be immediately bypassed to another, or the same execution unit if a dependent instruction has already been dispatched.

Coupled to the reservation station through Dispatch Ports 2, 3 and 4 are the memory system execution units. The AGU[0] and memory system cluster 117 calculates memory addresses for loads and processes them in the manner to be described more fully below. The load result is then provided to the ROB 40 and to the reservation station 20 through writeback path 120c. Similarly, stores are propagated through Dispatch Ports 3 and 4 of the reservation station 20. The AGU[1] unit 118 calculates store addresses and propagates them through the memory system to be described below.

Figure 4:
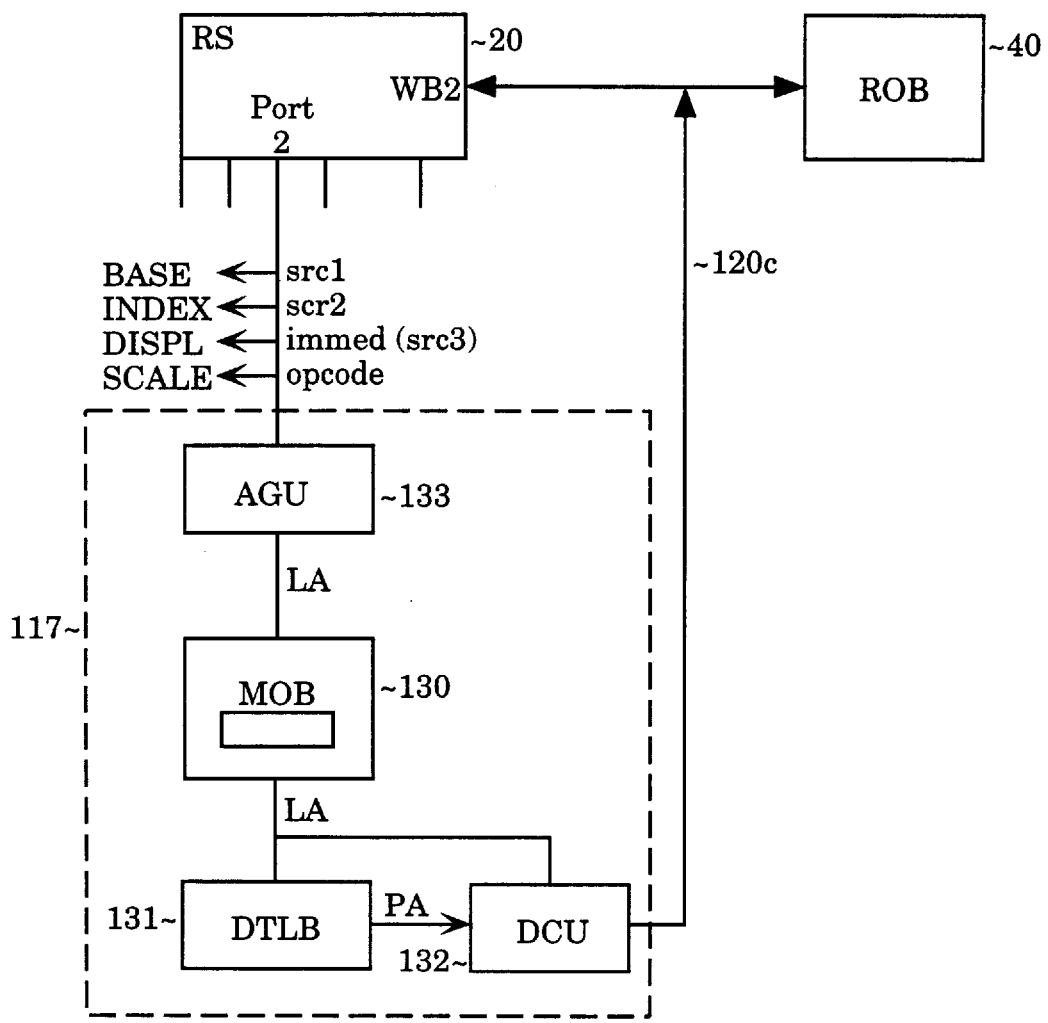
FIG. 4 illustrates a block diagram of the memory system components required for performing memory operations.

Referring now to FIG. 4 a portion of a microprocessor's architecture for performing a memory load operation is shown. As was described above, the reservation station 20 dispatches the load operation through Dispatch Port 2 to AGU[0] and memory system cluster 117. The operation dispatched from the reservation station includes an opcode which indicates that the operation to be carried out is a load, and two source operands, each 32 bits wide in one embodiment. In the illustrated embodiment, the opcode dispatched from the reservation station includes information identifying the scaling factor for calculating the memory address by the AGU[0] unit 117. The base information for the calculation is propagated as the source 1 input to the AGU[0] unit 133 while the index is the source 2 input. The displacement value is propagated as an immediate value, sometimes referred to as source 3. In one embodiment, data for a source 3 input is propagated on the upper bits of the source 2 operand transmission.

Once the AGU[0] unit 133 has received the inputs for determining the memory address of the load operation, it calculates the effective address (or linear address which is merely the effective address plus the segment base) and dispatches that to the memory system portion of the microprocessor. In the implemented embodiment, the AGU[0] unit 133 dispatches the linear address to a memory ordering buffer (MOB) 130. The MOB 130 is like a reservation station for the memory system. Load and store operations are buffered in the MOB 130 for dispatch to the memory devices so that memory operations are carried out in an appropriate order. For this example, it is assumed that a data load operation is being performed. The MOB 130, according to its own scheduling algorithms, eventually propagates the linear address to the memory system's data translation lookaside buffer (DTLB) 131 and to the data cache unit (DCU) 132. The DTLB 131 determines a physical address based on the linear address and further propagates that physical address to the DCU 132. If the requested data is in the cache 132, it is retrieved and propagated back to the reservation station and reorder buffer on writeback path 120c. If there is no cache miss, this process takes three clock cycles to complete in one embodiment. A cache miss will increase this latency because of the need to access an external memory device.

Figure 5:
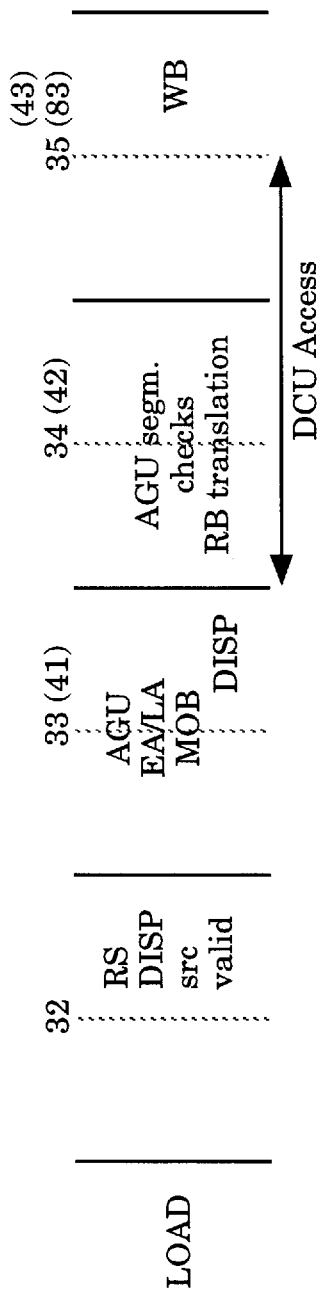
FIG. 5 illustrates an execution pipeline for performing memory operations in one embodiment of the present invention computer system.

FIG. 5 illustrates a portion of the execution pipeline for the memory system as described above. Dashed-lines are used to indicate the separation of high clock phase to low clock phase. It can be seen for a load that at the second half of the clock cycle 32 the reservation station dispatches the load request through Dispatch Port 2. At pipestage 33(41) the AGU[0] unit 133 calculates the linear address and dispatches that to the MOB which then dispatches the memory request to the memory system. During cycle 34(42) and the upper portion of cycle 35(43), the memory system accesses the data cache unit 132. Finally, during the low phase of the clock of pipestage 35 the result is written back to the reservation station and the reorder buffer.

It can be seen that the AGU[0] unit 133 at the beginning of the memory operation pipeline performs the calculation for a linear or effective address based on the provided base, index, displacement and scale values. However, the organization of the memory system requires a minimum of three clock cycles before any result is written back from the memory system to the reservation station. While it would be possible to provide a writeback path from the AGU[0] unit 133 to the reservation station for returning linear or effective addresses, this would complicate the reservation station scheduling logic as well as requiring the inclusion of arbitration circuitry for the writeback path 120c when other memory operations might be written back at the same time as the AGU's output thus potentially stalling the MOB 130.

From the above, it can be seen that although the memory execution units do perform the calculation for determining an effective or linear address determined by a base, index, displacement and scale factors, it is inefficient to use the memory system for this calculation when the only desired result is the calculated effective address. Accordingly, the present invention implements circuitry within integer execution unit (IEU[0]) 34 for performing a single-cycle calculation of an effective memory address. The microprocessor of the present invention incorporates a macro instruction "load effective address"(LEA) for calculating an effective address when given a base, displacement, index and scale. The LEA macro instruction is decoded into a single micro operation that is dispatched from the reservation station 20 through Dispatch Port 0 to the IEU[0] unit 34. The IEU[0] unit 34 calculates the effective memory address in one clock cycle and returns the result to the reorder buffer and on writeback bus 120 into writeback port 0 of the reservation station 20 one clock cycle after dispatch.

Figure 6:
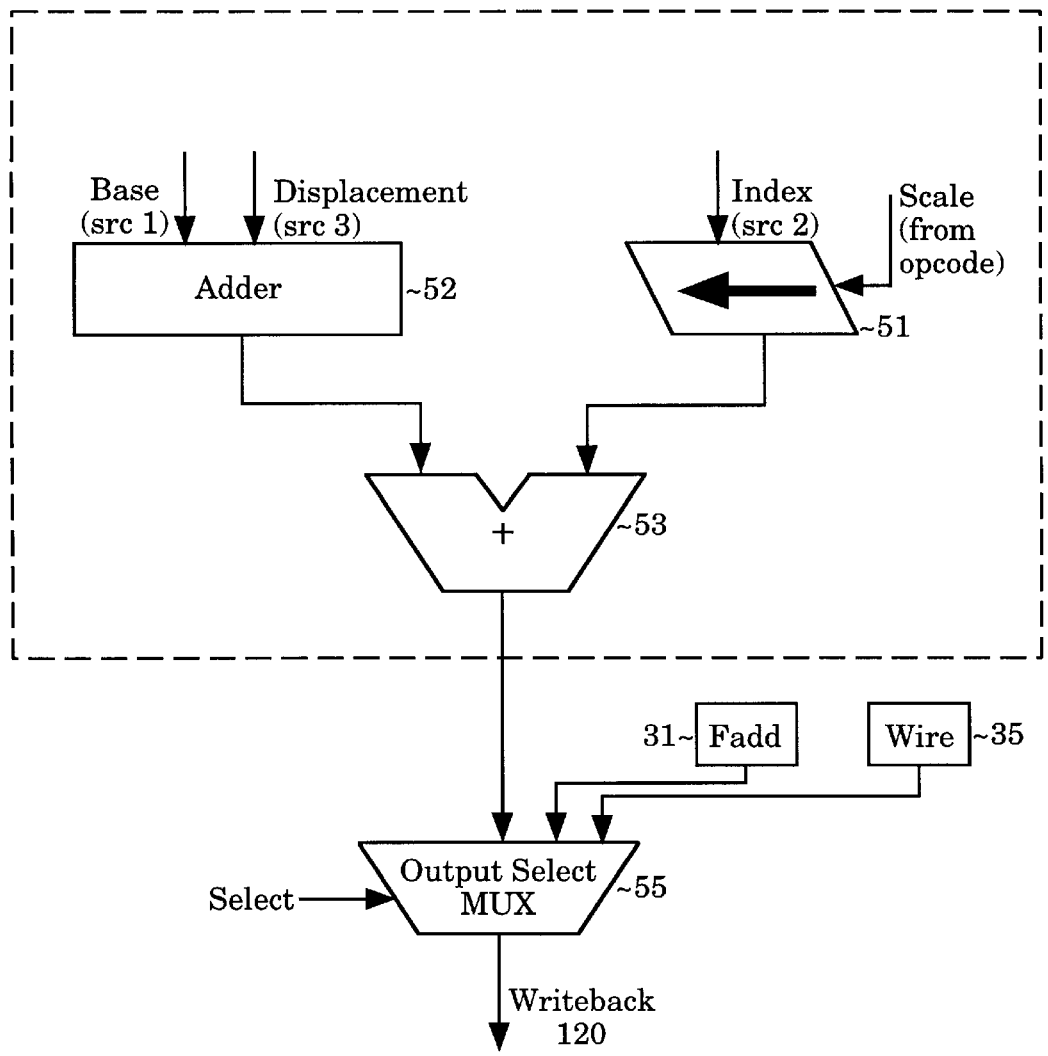
FIG. 6 illustrates a block figure of the components implemented in a single-cycle execution unit for calculating effective addresses in accordance with one embodiment of the present invention.

Referring now to FIG. 6, a portion of the calculating components incorporated into IEU[0] unit 34 is illustrated. The functional blocks shown in FIG. 6 are in addition to the other functional blocks that the integer execution unit 34 includes. The circuitry shown carries out the following calculation to determine an effective memory address:

base+(index*scale)+displacement

The multiplication of the index by the scale factor is carried out by a left shifter 51. The left shifter 51 receives the source 2 input which, as described above, is the index. The scale factor is provided by the control circuitry decoding the opcode. The left shifter can be used in the one embodiment for the multiplication because the scaling factors are constrained to be equal to $2^n$ where n is a positive integer or zero. The product of the index and the scale factor is added to the base and the displacement. The base and displacement are received on sources 1 and 3, respectively, and are propagated through adder 52. The output of the adder 52 and the left shifter 51 are then provided to the two-input adder 53 which in one embodiment is a Kogge-Stone adder. The result from the two-input adder is thus the calculated effective address. This result is propagated through output select multiplexer 55 and routed through writeback bus 120 to the reservation station 20 and to the reorder buffer 40. In an alternative embodiment the adder 52 and two-input adder 53 may be replaced with a three-input adder.

Figure 7:
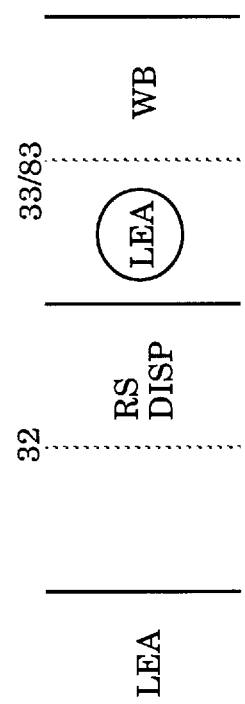
FIG. 7 illustrates the execution pipeline for carrying out effective address calculations in a single-cycle execution unit.

FIG. 7 shows the executed pipestages for carrying out the LEA operation. It can be seen that at the bottom half of clock stage 32 the reservation station dispatches the LEA operation to the execution unit. At the upper stage of pipestage 33 the operation is carried out and writeback is performed on the low phase clock edge. Accordingly, it can be seen that where the memory system would require three clock cycles to return the result, using the single-cycle execution unit 34 results in only one clock cycle being needed for returning an effective address.

Another aspect of the present invention is that it provides a mechanism for carrying out certain multiplications in a single clock cycle. As was described above, the execution units performing multiply operations take between three and five clock cycles. Where it is desirable to perform a multiply operation such as X times $2^n$, the LEA macro instruction may be used to yield a result in a single clock cycle. The micro programmer specifies that the base and displacement values are zero. The index value is set to the desired multiplier value and the scale factor is accordingly set so that $2^{space}$ is the desired multiplicand. The LEA instruction then carries out the index*$2^{scale}$ evaluation in one clock cycle and returns the result. In the one embodiment where the multiply portion of the effective address calculation is carried out by a left shifter, the multiplicand is constrained to being a value equal to $2^n$ (such as 2, 4, 8 . . . ).

There has thus described a method and apparatus for calculating effective address in a single-cycle execution unit independent of the microprocessor's memory execution units. Although the present invention has been described in terms of various embodiments, it will be appreciated by those skilled in the art that various modifications and alterations might be made without departing from the spirit and scope of the present invention. The invention should, therefore, be measured in terms of the claims which follow.

We claim:

1. A processor having more than one execution unit, said processor comprising:
   a single-cycle arithmetic execution unit, the single-cycle arithmetic execution unit comprising
   integer calculation logic, said integer calculation logic for performing integer mathematical and logic operations,
   a first effective address generation logic for calculating a first effective memory address determined by a first base value, a first index, a first scale factor and a displacement value, said
   first effective address generation logic comprising
   a multiplier for multiplying the first index by the first scale factor to produce a scaled index value,
   an adder coupled to the multiplier for adding the scaled index value to the first base value and to the first displacement value to produce said first effective memory address; and
   a multiple-cycle memory access execution unit, said multiple-cycle memory access execution unit comprising
   a second effective address generation logic for calculating a second effective memory address determined by a second base value, a second index, a second scale factor and a second displacement value,
   a segment violation checker, said segment violation checker for determining if said second effective memory address is a legal memory address,
   memory access logic, said memory access logic for accessing data located at said second effective memory address.

2. The single-cycle arithmetic execution unit of claim 1 wherein the multiplier of the first effective address generation logic comprises a left shifter for left shifting the index responsive to the scale factor to produce the scaled index value.

3. The single-cycle arithmetic execution unit of claim 2 wherein the adder of the first effective address generation logic comprises:
   a first adder for adding the base value to the displacement value for producing an offset value; and
   a two-input adder coupled to the first adder and to the left shifter for adding the scaled index value to the offset value to produce the first effective memory address.

4. The single-cycle arithmetic execution unit of claim 3 wherein the two-input adder of the first effective address generation logic comprises a Kogge-Stone adder.

5. A microprocessor, the microprocessor being coupled to a memory, the memory for storing data according to a segmented memory configuration, the microprocessor comprising:
   a reservation station for scheduling and dispatching computer instructions with source operands to execution units;
   a first arithmetic execution unit coupled to receive instructions and source operands from the reservation station, the first arithmetic execution unit for initiating memory operations for the microprocessor including calculating a first effective address in accordance with the segmented memory configuration, checking said first effective memory address for segment violations, and accessing memory using said first effective memory address, the first execution unit requiring more than a single clock cycle to return memory result data;
   a second arithmetic execution unit coupled to receive instructions and source operands from the reservation station, the second arithmetic execution unit for calculating a second effective memory address in accordance with the segmented memory configuration, the second execution unit requiring only a single clock cycle to return said second effective memory address, the second execution unit also performing integer logic operations; and a reorder buffer coupled to the first and second arithmetic execution units for buffering result data from the first and second arithmetic execution units until the result data is ready for retirement.

6. The microprocessor of claim 5 wherein the second arithmetic execution unit includes an effective address calculator for calculating said second effective memory address determined by a base value, an index, a scale factor and a displacement value which are provided to the second execution unit incorporated into an instruction and its associated source operands, the effective address calculator comprising:

a multiplier for multiplying the index by the scale factor to produce a scaled index value; and an adder coupled to the multiplier for adding scaled index value to the base value and to the displacement value to produce said second effective memory address to be returned as result data.

7. The microprocessor of claim 6 wherein the multiplier comprises a left shifter for left shifting the index responsive to the scale factor to produce the scaled index value.

8. The microprocessor of claim 7 wherein the adder comprises:

a first adder for adding the base value to the displacement value for producing an offset value; and a two-input adder coupled to the first adder and to the left shifter for adding the scaled index value to the offset value to produce the first effective memory address.

9. The microprocessor of claim 8 wherein the two-input adder comprises a Kogge-Stone adder.

10. The computer system of claim 8 wherein the two-input adder comprises a Kogge-Stone adder.

11. A computer system comprising:

an input/output means providing a communicating interface;

a memory means coupled to the input/output means for storing instructions and computer data;

data input means coupled to the input/output means for providing data input and data output to interface the computer system with a computer user; and microprocessor means coupled to the input/output means for executing instructions and processing computer data, the microprocessor means operating in accordance with segmented memory protocol, the microprocessor including:

a reservation station for scheduling and dispatching computer instructions with source operands to execution units;

a first arithmetic execution unit coupled to receive instructions and source operands from the reservation station, the first arithmetic execution unit for initiating memory operations for the microprocessor including calculating a first effective memory address in accordance with the segmented memory configuration, checking said first effective memory address for segment violations, and accessing memory using said first effective memory address, the first arithmetic execution unit requiring more than a single clock cycle to return memory result data;

a second arithmetic execution unit coupled to receive instructions and source operands from the reservation station, the second arithmetic execution unit for calculating a second effective memory address in accordance with the segmented memory configuration, the second arithmetic execution unit requiring only a single cycle to calculate and return said second effective memory address, the second arithmetic execution unit also performing integer logic operations; and a reorder buffer coupled to the first and second arithmetic execution units for buffering result data from the first and second arithmetic execution units until the result data is ready for retirement.

12. The computer system of claim 11 wherein the second arithmetic execution unit includes an effective address calculator for calculating said second effective memory address determined by a base value, and index, a scale factor and a displacement value which are provided to the second arithmetic execution unit incorporated into an instruction and said instruction's associated source operands, the effective address calculator comprising:

a multiplier for multiplying the index by the scale factor to produce a scaled index value; and an adder coupled to the multiplier for adding scaled index value to the base value and to the displacement value to produce said second effective memory address to be returned as result data.

13. The computer system of claim 12 wherein the multiplier comprises a left shifter for left shifting the index responsive to the scale factor to produce the scaled index value.

14. The computer system of claim 13 wherein the adder comprises:

a first adder for adding the base value to the displacement value for producing an offset value; and a two-input adder coupled to the first adder and to the left shifter for adding the scaled index value to the offset value to produce the effective address.

* * * * *